(12) United States Patent
Broemeling

(10) Patent No.: US 7,631,881 B2
(45) Date of Patent: Dec. 15, 2009

(54) TOWABLE WHEELED VEHICLE HAVING A STEERING AXLE

(76) Inventor: Greg Broemeling, 27980 N. Juliaetta Grade, Juliaetta, ID (US) 83535

( * ) Notice: Subject to any disclaimer, the term of this patent is extended or adjusted under 35 U.S.C. 154(b) by 398 days.

(21) Appl. No.: 11/827,967

(22) Filed: Jul. 16, 2007

(65) Prior Publication Data

US 2009/0020983 A1   Jan. 22, 2009

(51) Int. Cl.
B62D 13/06 (2006.01)

(52) U.S. Cl. ............... 280/5.521; 280/86.751; 280/DIG. 14; 280/442; 280/460.1; 280/443

(58) Field of Classification Search ........... 280/5.521, 280/86.751, 86.5, DIG. 14, 400, 442, 443, 280/426
See application file for complete search history.

(56) References Cited

U.S. PATENT DOCUMENTS

| | | | |
|---|---|---|---|
| 2,345,945 A | 4/1944 | Miner | |
| 4,076,264 A | 2/1978 | Chatterley | |
| 4,087,008 A | 5/1978 | Silva, Jr. | |
| 4,512,593 A | 4/1985 | Ehrhardt | |
| 4,664,403 A | 5/1987 | Livingston | |
| 4,770,430 A * | 9/1988 | Lange | 280/81.6 |
| 4,792,148 A * | 12/1988 | Hintz | 280/149.1 |
| 4,824,135 A | 4/1989 | McGregor | |
| 5,015,004 A * | 5/1991 | Mitchell | 280/81.6 |
| 5,018,756 A * | 5/1991 | Mitchell | 280/81.6 |
| 5,035,439 A * | 7/1991 | Petrillo | 280/81.6 |
| 5,320,376 A | 6/1994 | Bojarski et al. | |
| 5,474,320 A | 12/1995 | Bojarski et al. | |
| 5,816,605 A * | 10/1998 | Raidel, Sr. | 280/676 |
| 6,007,078 A * | 12/1999 | Gottschalk et al. | 280/86.751 |
| 6,036,217 A * | 3/2000 | Burkhart et al. | 280/476.1 |
| 6,073,946 A | 6/2000 | Richardson | |
| 6,182,984 B1 | 2/2001 | Chalin | |
| 6,293,570 B1 * | 9/2001 | Gottschalk et al. | 280/86.751 |
| 6,626,449 B2 | 9/2003 | Hazen | |
| 2003/0107198 A1 * | 6/2003 | VanDenberg | 280/86.5 |
| 2005/0046146 A1 * | 3/2005 | Plante | 280/460.1 |

* cited by examiner

*Primary Examiner*—Ruth Ilan
(74) *Attorney, Agent, or Firm*—Bergman & Jeckle PLLC (57) ABSTRACT

A towable wheeled vehicle releasably attachable to a towing vehicle at two horizontally spaced apart points provides a frame supporting a deck, a wheel carriage having a leaf spring suspension and a tubular steering axle with rotatable and turnable wheels at each end, and an electrically powered pneumatic system. Airbags communicating between the steering axle and the frame inflate and deflate to axially rotate the steering axle in axle sleeves carried by the leaf spring suspension reversing the caster and camber of the wheels responsive to activation of the towing vehicle's back up lights.

5 Claims, 8 Drawing Sheets

TOWABLE WHEELED VEHICLE HAVING A STEERING AXLE

BACKGROUND OF INVENTION

A. Related Applications

There are no applications related hereto heretofore filed in this or in any foreign country.

B. Field of Invention

This invention relates to land vehicles, and more particularly to towable wheeled land vehicles having steering axles that change the caster of the wheels for forward and rearward movement.

BACKGROUND AND DESCRIPTION OF PRIOR ART

Travel trailers and motor coaches are popular for recreation. Motor coaches are self powered vehicles while travel trailers must be towed by a powered towing vehicle such as a pickup truck.

A disadvantage of travel trailers is that most powered towing vehicles can only tow one trailer. Because the travel trailer occupies the one towed vehicle position, operators can not easily take along the other recreation items, such as a golf cart, a boat or all-terrain vehicles (ATV's) that are also typically carried by trailers. In order for travel trailer user to bring along such other recreation items, expensive custom racks must be built, or a second powered towing vehicle such as a second pickup truck must accompany the powered vehicle towing the travel trailer. Use of two vehicles prevents travel partners from traveling together, increases expenses for fuel and the like, and increases the number of vehicles on the road. Operators of motor coaches face the similar problem, they too are limited to towing one vehicle.

One solution to this problem is to tow two trailers in tandem behind a powered towing vehicle. Unfortunately, the towing of tandem trailers is fraught with problems. First, towing tandem trailers is difficult and in some jurisdictions tandem towing is prohibited. Where tandem towing is permitted, operators may need to have special training, licenses and permits. Further, while tandem towing may be permitted in one state, it may be prohibited in an adjoining state making interstate travel problematic.

Another problem is that it is nearly impossible to simultaneously back-up pivotally attached tandem trailers because the tandem trailers "jack-knife" relative to the powered towing vehicle, and relative to each other, because each vehicle turns in opposite directions. The towing of plural pivotally interconnected tandem vehicles is also unstable because each vehicle can pivot relative to all the other vehicles about a vertical axis and about a horizontal axis which leads to "fishtailing" of the towed vehicles and "whipping" of the powered towing vehicle. Additionally, the tires on the towed vehicles tend to "cut" corners while turning rather than tracking around the corners leading to difficult maneuvering in traffic.

It is well known that positive caster makes towing a vehicle easier because the towed vehicle "tracks" behind the towing vehicle more precisely. Positive caster means an upper ball joint is slightly rearward of the center of the wheel and the lower ball joint is slightly forward of the center of the wheel. Unfortunately, although positive caster makes towing and forward movement easier, positive caster makes backing up difficult. To make backing up easier, the caster of the wheels may be reversed to negative caster where the upper ball joint is forward of the center of the wheel and the lower ball joint is rearward of the center of the wheel. Changing the caster of the wheels may be accomplished by axially rotating the vehicle axle.

What is needed is a towable wheeled vehicle that may be towed behind a powered towing vehicle as well as towed behind another towed vehicle that is easily backed up, does not jackknife, is stable at all speeds, is easily maneuverable because it tracks behind the towing vehicle and does not require specialized training, licensing, permits, or being left at a border of a state that prohibits tandem towing.

My towable wheeled vehicle having a steering axle overcomes various of the aforementioned drawbacks by providing a frame pivotally attached to a towing vehicle at two horizontally spaced apart points allowing the towable wheeled vehicle to pivot vertically about a horizontal axis but preventing pivoting about a vertical axis. Leaf springs depend from parallel spaced apart frame side beams and carry tubular axle sleeves that rotatably carry a tubular steering axle therein. The steering axle has a spindle yoke, angled for positive camber, at each opposed end that journals a wheel spindle on a kingpin axle. A tie rod interconnects tie rod arms of each wheel spindle so that the wheel spindles move in unison. A first airbag lever arm and a second airbag lever arm each structurally attached to the tubular steering axle and extending radially therefrom each communicate with an air bag positionally maintained on an airbag base carried by a sway bar spacedly rearwardly adjacent the tubular steering axle. A pneumatic system having an air pump, an air reservoir, a pneumatic switch and plural air lines inflates and deflates the airbags to axially rotate the steering axle and change the caster of the wheels when the towing vehicle's backup lights are energized.

My invention does not reside in any one of the identified features individually but rather in the synergistic combination of all of its structures, which give rise to the functions necessarily flowing therefrom as hereinafter specified and claimed.

SUMMARY

A towable wheeled vehicle, releasably attachable to a towing vehicle at two horizontally spaced apart points, provides a frame supporting a deck, a wheel carriage having a leaf spring suspension and a tubular steering axle with rotatable and turnable wheels at each end and an electrically powered pneumatic system. Airbags communicating between the steering axle and the frame inflate and deflate to axially rotate the steering axle in axle sleeves carried by the leaf spring suspension reversing the caster of the wheels responsive to activation of the towing vehicle's back up lights.

In providing such an apparatus it is:

a principal object to provide a towable wheeled vehicle having a steering axle with reversible wheel caster causing the wheels to turn cooperatively with the powered towing vehicle's steering wheels when moving forwardly and when moving rearwardly.

a further object to provide such a towable wheeled vehicle that automatically reverses the caster of the wheels when the powered towing vehicle's back up lights are energized.

a further object to provide such a towable wheeled vehicle that is releasably fastened to a towing vehicle at two horizontally spaced apart points allowing the towable wheeled vehicle to pivot vertically about a horizontal axis but preventing pivoting about a vertical axis.

a further object to provide such a towable wheeled vehicle that may be towed behind a towed vehicle.

a further object to provide a steering axle system that is actuated automatically.

a further object to provide such a steering axle system that improves the stability of towing vehicles to which the towable wheeled vehicle is attached.

a further object to provide such steering axle system that uses pneumatics to change the caster of the wheels.

a further object to provide such a steering axle system that has safety redundancy by spring biasing the steering axle to positive caster.

a further object to provide such a steering axle system that does not require a power source independent of the powered towing vehicle.

a further object to provide such a steering axle system that has a pneumatically operated axle locking mechanism that optionally prevents the steering axle from steering.

a still further object to provide such a towable wheeled vehicle having a steering axle that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout.

DESCRIPTION OF PREFERRED EMBODIMENT

As used herein, the term "forward", its derivatives, and grammatical equivalents refers to the portion of my towable wheeled vehicle that is closest to a towing vehicle. The term "rearward", its derivatives, and grammatical equivalents refers to the portion of my towable wheeled vehicle that is most distant from the towing vehicle. The term "outer", its derivatives, and grammatical equivalents refer to a driver side or passenger side of the towable wheeled vehicle as opposed to a laterally medial portion of the towable wheeled vehicle. The term "towed vehicle" is defined as a wheeled vehicle attached adjacent behind a towing vehicle. The term "towing vehicle" is defined as a vehicle immediately in front of the towable wheeled vehicle. The towing vehicle may be powered, if so indicated, or may itself be a "towed vehicle".

My towable wheeled vehicle 10 having a steering axle generally provides a frame 11 carrying a steering axle 12 having an axle locking mechanism 119, and a pneumatic system 13.

The frame 11 has a driver side beam 15, a parallel spaced apart passenger side beam 16 and structurally attached cross-beam 17 communicating perpendicularly therebetween. Forward end portion 15a, 16a of each side beam 15, 16 releasably communicates with towing vehicle frame extensions 69 that are structurally carried by and extend rearwardly from the towing vehicle (not shown). Releasable tow bar fasteners 21 extend through horizontally aligned holes (not shown) defined in the forward end portions 15a, 16a of side beams 15, 16 and in the towing vehicle frame extensions 69 providing two horizontally spaced apart pivots that allow the towable wheeled vehicle 10 to pivot vertically relative to the towing vehicle but preventing any horizontal pivoting.

A deck 27 is carried on top of the frame 11 and is attached thereto with known means (not shown). The deck 27 is generally planar and rectilinear having a forward end portion 27a, a rearward end portion 27b, a driver side portion 27c and a passenger side portion 27d. Deck edge walls 30 are structurally carried at the forward end portion 27a, the driver side portion 27c and passenger side portion 27d and extend perpendicularly below the deck 27 providing rigidity and aesthetic appeal. A tail-light panel 31 structurally depends from the rearward end portion 27b for mounting tail-lights and the like.

Figure 6:
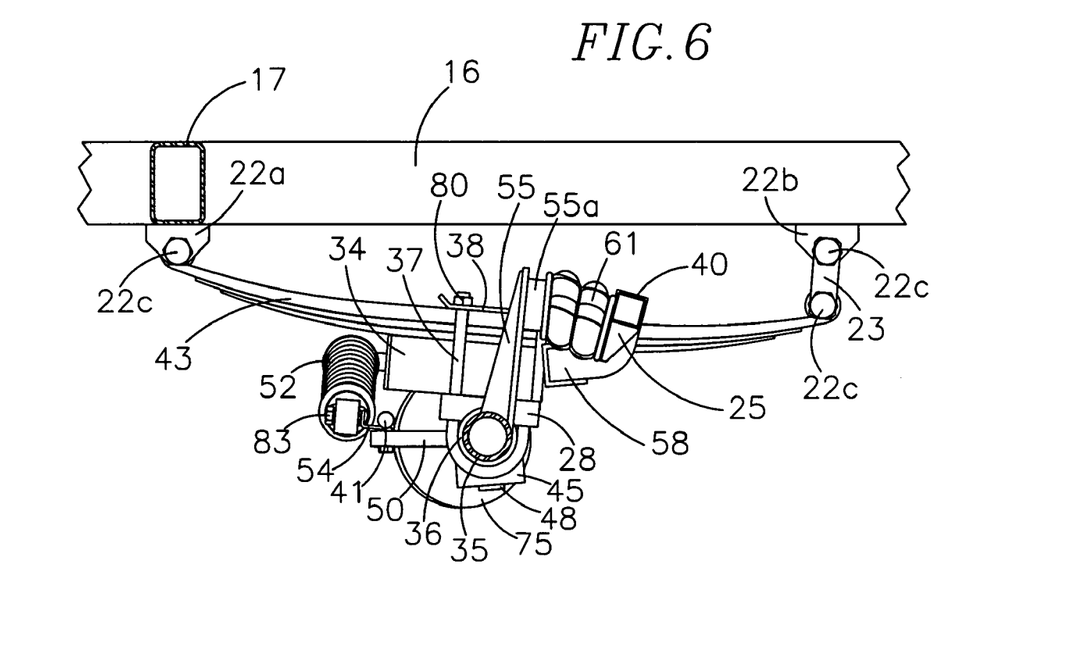
FIG. 6 is a partial cutaway orthographic cross-section view of the axle and passenger side leaf spring showing the horizontally expanding airbag inflated and the axle rotated to negative caster for backing up.
Figure 7:
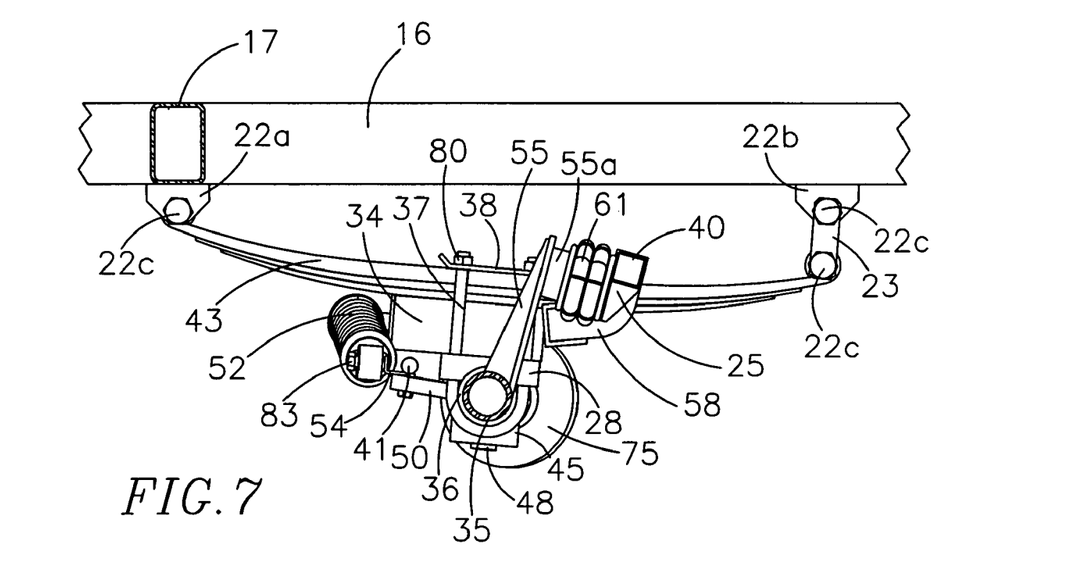
FIG. 7 is an orthographic cross-section view similar to that of FIG. 6 showing the horizontally expanding airbag deflated and the axle rotated to positive caster for forward travel.

As shown in FIGS. 6 and 7, forward leaf spring brackets 22a and rearward leaf spring brackets 22b structurally depend from each side beam 15, 16 at positions generally equally spaced forwardly and rearwardly from middle of each side beam 15, 16. Each leaf spring bracket 22a, 22b defines a pair of aligned holes (not shown) to releasably carry a bolt type fastener 22c extending therethrough and therebetween. A shackle 23 depends from each rearward leaf spring bracket 22b and is pivotally connected thereto with bolt type fastener 22c extending horizontally through aligned holes (not shown) defined therein. Leaf spring 43 communicates between the forward leaf spring bracket 22a and non-attached end portion of the proximate rearward shackle 23 and is releasably affixed thereto with bolt type connectors 22c providing a suspension for the towable wheeled vehicle 10.

Figures 10, 11:
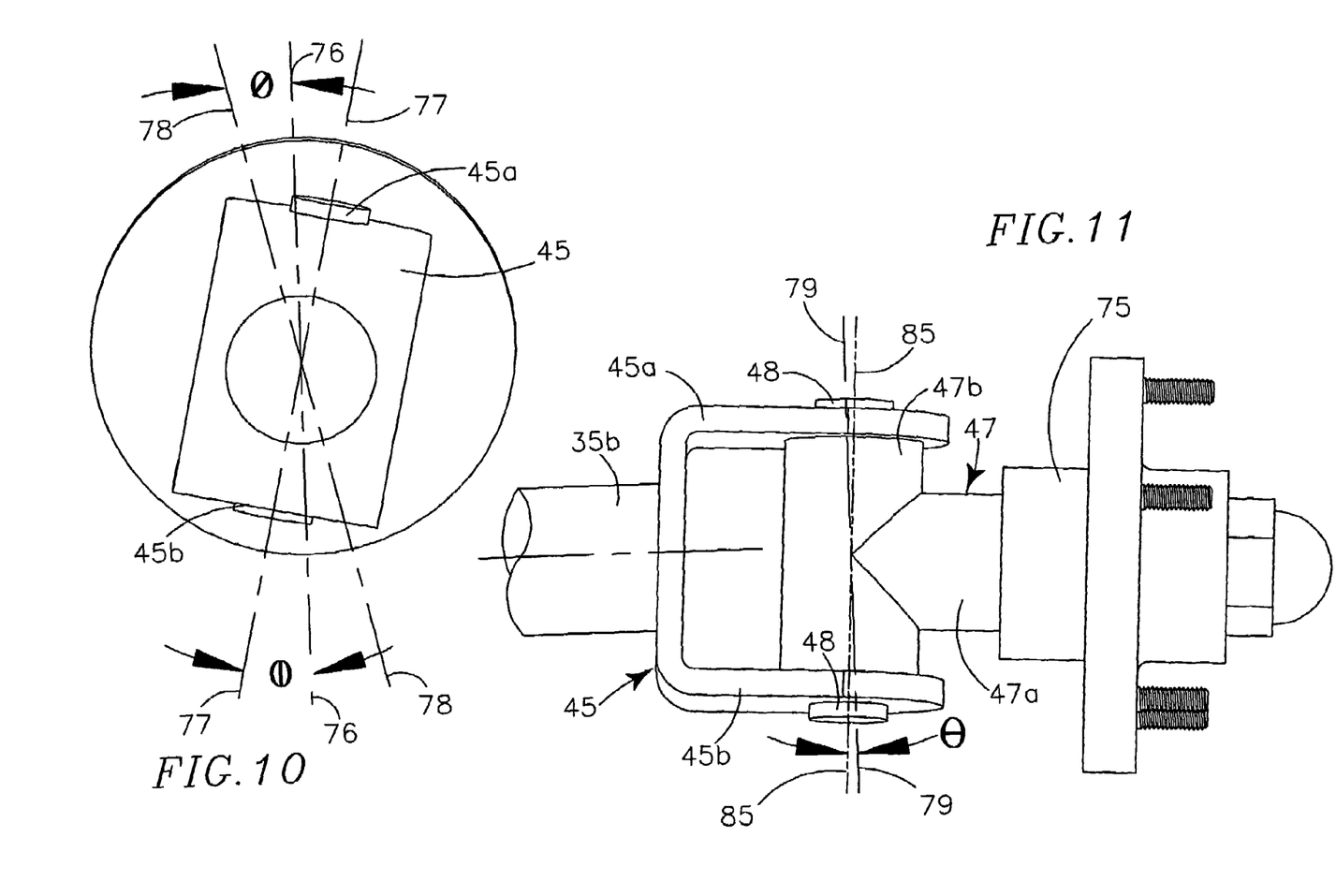
FIG. 10 is a diagrammatic end view of a spindle yoke showing positive caster and negative caster relative to vertical.
FIG. 11 is a partial orthographic cut-away rear view of a spindle yoke carrying a wheel spindle on a kingpin axle showing positive camber angle relative to vertical.

The steering axle 12 has an elongate tubular axle body 35 with a driver side end 35a, structurally carrying spindle yoke 44, and an opposing passenger side end 35b structurally carrying spindle yoke 45. As shown in FIG. 11, each spindle yoke 44, 45 is angulated (shown by line 85) relative to vertical (shown by line 79) at angle ⊖ to provide positive camber to a pivotally supported wheel spindle 46, 47. Positive camber means a top portion of an attached wheel 82 is slightly outward bottom portion of the attached wheel 82. Positive camber enhances stable tracking and turning of the towable wheeled vehicle 10.

Figure 1:
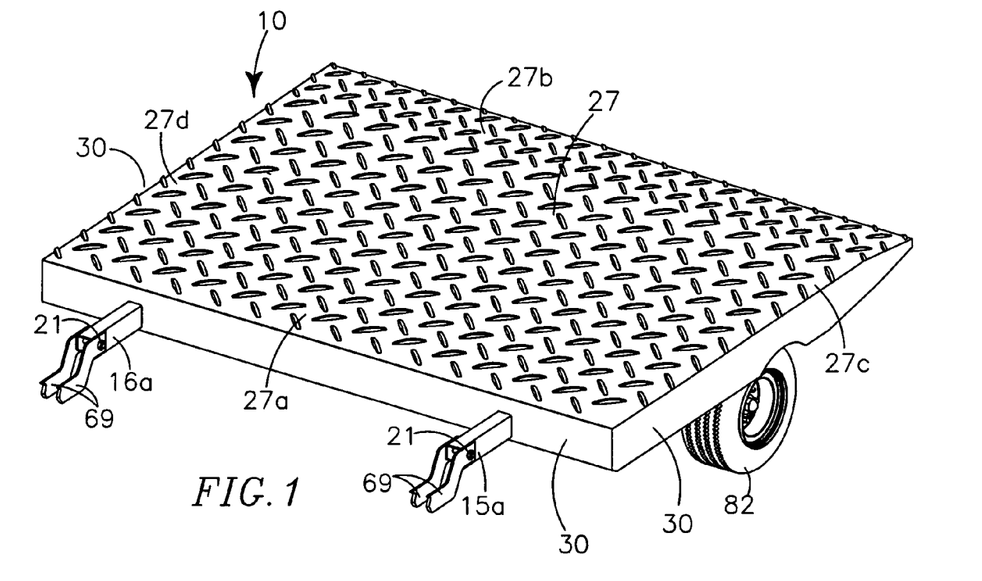
FIG. 1 is an isometric front, top and driver side view of my towable wheeled vehicle having a steering axle.
Figure 2:
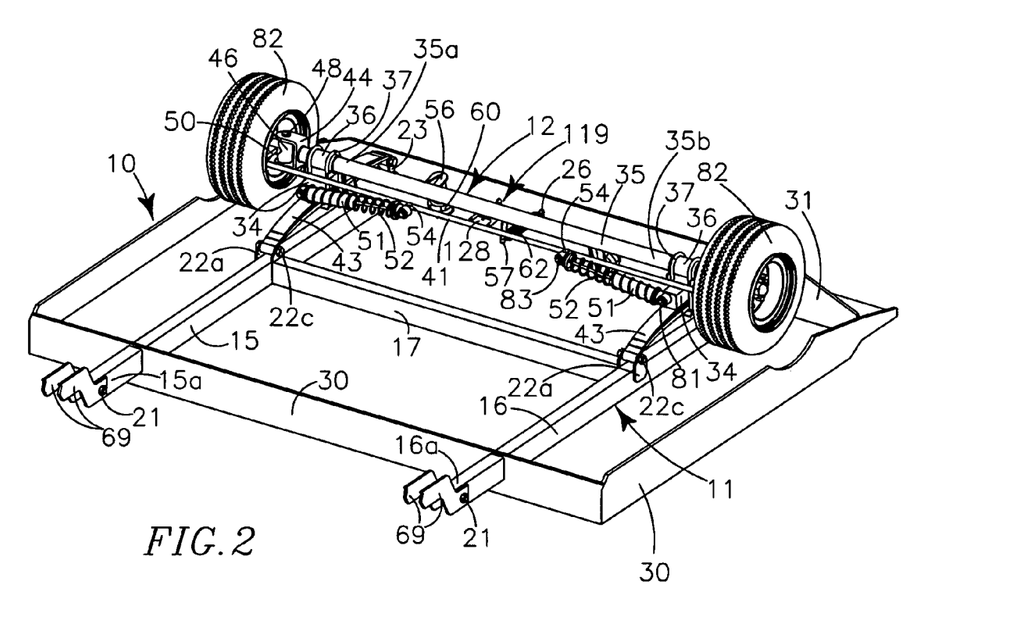
FIG. 2 is an isometric front, bottom and passenger side of the towable wheeled vehicle of FIG. 1.
Figure 3:
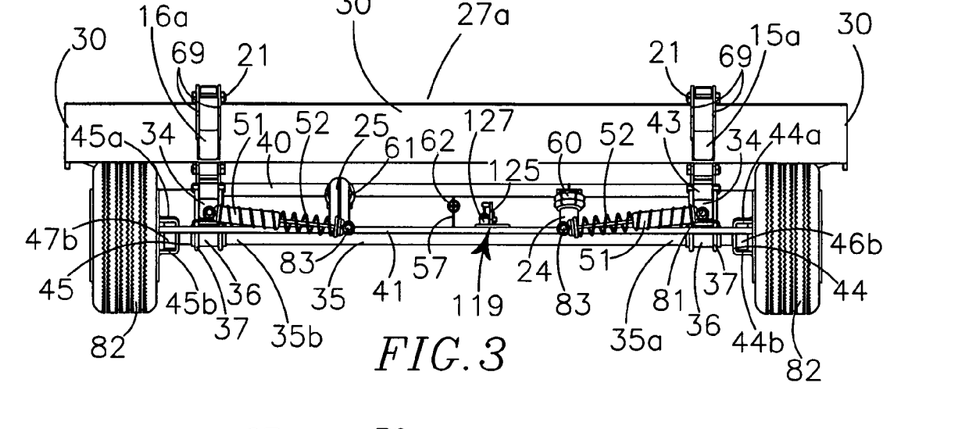
FIG. 3 is an orthographic front view of the towable wheeled vehicle of FIG. 1.
Figure 4:
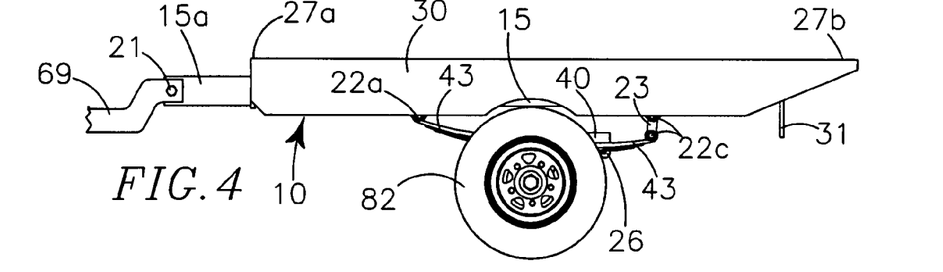
FIG. 4 is an orthographic driver side view of the towable wheeled vehicle of FIG. 1.

Two spaced apart tubular axle sleeves 36, (FIG. 3), each defining an axial through channel (not shown), are carried on the tubular axle body 35 one axle sleeve 36 spacedly inwardly adjacent each axle yoke 44, 45. The tubular axle body 35 is carried within the axial channel defined by each axle sleeve 36 and is axially rotatable therein. Protuberances (not shown) on the tubular axle body 35 adjacent edges of each axle sleeve 36 prevent the tubular axle body 35 from moving laterally within the axle sleeves 36 keeping the tubular axle body 35 laterally centered relative to the frame 11.

As shown in FIGS. 6 and 7, a stabilizer block 28 having a planar top surface, (not shown) an opposing bottom surface (not shown) defining a transverse concave groove (not shown) for an axle sleeve 36 and plural spacedly arrayed vertical holes (not shown) for U-bolts 37 is carried on upper circumferential surface of each axle sleeve 36 providing a mounting surface for an axle block 34. Each axle block 34 is positionally maintained between planar top surface of stabilizer block 28 and bottom medial portion of leaf spring 34 with plural U-bolts 37. Each U-bolt 37 carries axle sleeve 36 within the area defined by the U-bolt 37 and threaded end portions of each U-bolt 37, opposite the axle sleeve 36, extend through the spacedly arrayed holes defined in stabilizer block 28. A U-bolt mounting plate 38 defining a matching pattern of spacedly arrayed holes (not shown) is carried on the top medial surface (not shown) of leaf spring 43 opposite the axle block 34, and the threaded end portions of each U-bolt 37 extend through the spacedly arrayed holes defined therein. U-bolt nuts 80 engage with the threaded end portions and secure the U-bolts 37 to the mounting plate 38 responsively securing the axle sleeves 36, the tubular axle body 35, the stabilizer blocks 28 and the axle blocks 34 to the leaf springs 43.

Figure 5:
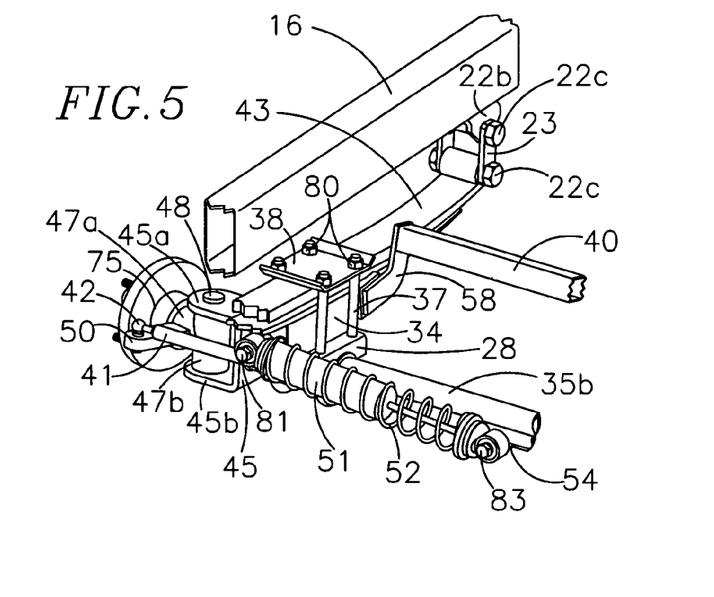
FIG. 5 is a partial cutaway isometric front and top view of the passenger side spindle yoke, wheel spindle, leaf spring, axle block, sway bar bracket and self centering stabilizer shock.

A threaded hole (not shown) is defined in forward end portion of each axle block 34 to releasably carry a threaded fastener 81 for mounting an outer end portion of a self centering stabilizer shock 51. (FIG. 5). A sway bar bracket 58 is structurally carried at rearward end portion of each axle block 34 and extends rearwardly therefrom spacedly adjacent inward of and parallel to the proximate leaf spring 43.

A driver side wheel spindle 46 is journaled by the driver side spindle yoke 44 and pivots relative thereto on kingpin axle 48 extending through kingpin axle sleeve 46b. Similarly, a passenger side wheel spindle 47 is journaled by the passenger side spindle yoke 45 and pivots relative thereto on kingpin axle 48 extending through kingpin axle sleeve 47b. A wheel hub 75 is rotatably carried by each wheel spindle 46, 47 on stub axle 46a, 47a extending outwardly from and perpendicular to kingpin axle sleeve 46b, 47b. Each wheel hub 75 releasably carries a wheel and tire combination 82.

Each wheel spindle 46, 47 has a tie rod arm 50 that extends forwardly therefrom perpendicular to the stub axle 46a, 47a and perpendicular to the kingpin axle sleeve 46b, 47b. An elongate tie rod 41 carrying a tie rod end 42 at each opposing end portion interconnects the tie rod arms 50 of the opposing wheel spindles 46, 47 causing the opposing wheel spindles 46, 47 to turn in unison. Stabilizer shock mounting brackets 54 are carried by the tie rod 41 spacedly inward each tie rod end 42, and a tie rod plate 128, (FIG. 14) for the axle locking mechanism 119, is structurally carried by the tie rod 41 between the two stabilizer shock mounting brackets 54.

Self centering stabilizer shocks 51 spacedly forward of and generally parallel to the tubular axle body 35 dampen movement of the tie rod 41 and the interconnected wheel spindles 46, 47. Outer end portion of each stabilizer shock 51 is secured to an axle block 34 with threaded fastener 81 that engages with the threaded hole (not shown) defined in the forward end portion of the axle block 34. Inner end portion of each stabilizer shock 51 is secured to the proximate stabilizer shock mounting bracket 54 carried by the tie rod 41 with threaded fastener 83. Over shock coil springs 52 are carried by and about each stabilizer shock 51 to positionally bias the stabilizer shock 51 to a neutral position which responsively biases tie rod 41, wheel spindles 46, 47 and the wheel tire combinations 82 carried thereby to a center alignment for forward movement and towing.

Figure 8:
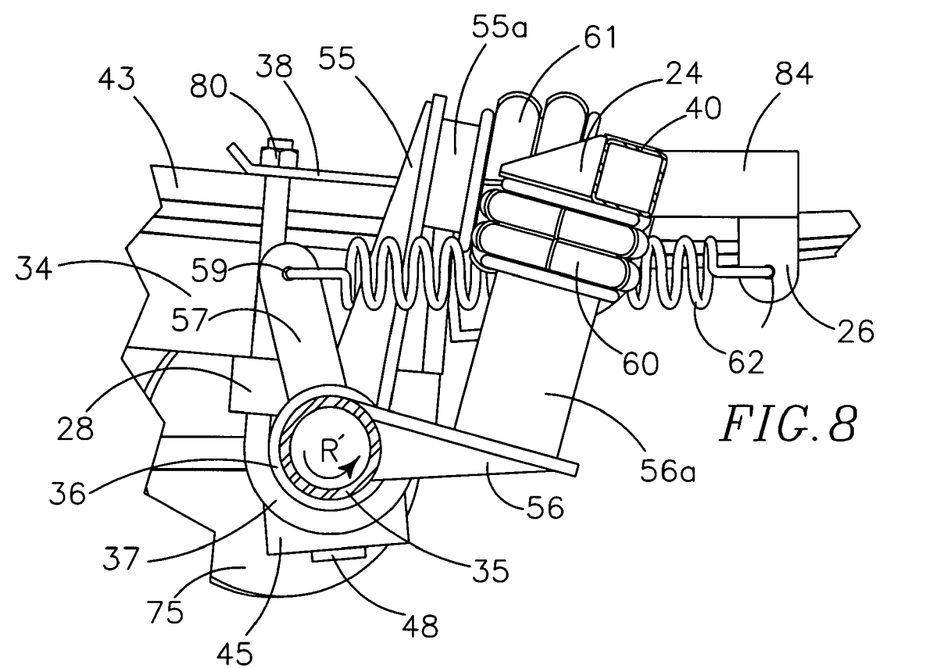
FIG. 8 is an enlarged partial cutaway orthographic cross-section view of the axle showing the horizontally expanding airbag inflated, the vertically expanding airbag deflated, and the biasing spring stretched with the axle rotated to negative caster for backing up.
Figure 9:
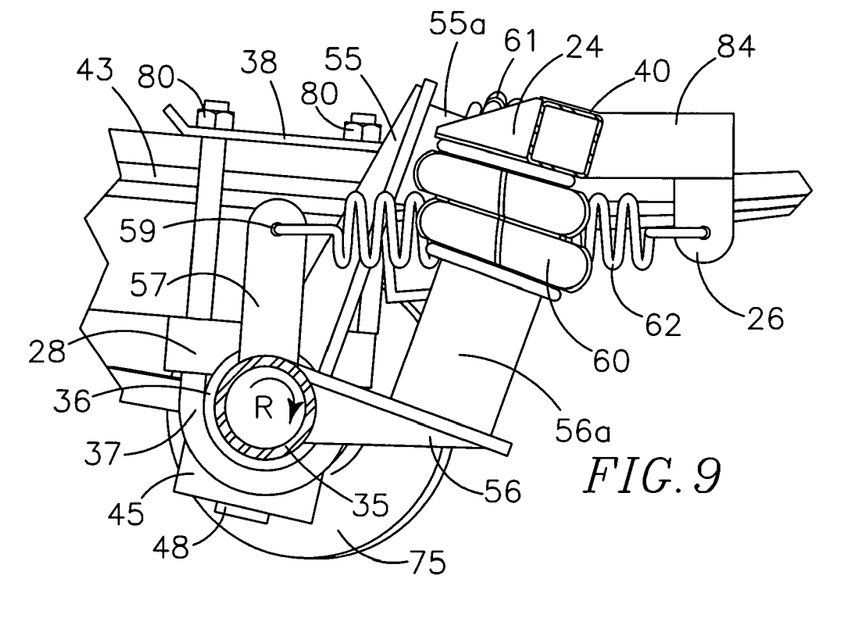
FIG. 9 is an orthographic cross-section view similar to that of FIG. 8 showing the horizontally expanding airbag deflated, the vertically expanding airbag inflated and the biasing spring contracted with the axle rotated to positive caster for forward travel.

As shown in FIGS. 8 and 9, a first airbag lever arm 56 for a vertically expanding first airbag 60, and a second airbag lever arm 55 for a horizontally expanding second airbag 61, are structurally carried by the tubular axle body 35 extending radially therefrom at spaced apart positions and are generally perpendicular to one another. The first airbag lever arm 56 carries first airbag seat 56a at an end portion opposite the tubular axle body 35 that extends perpendicular to the first airbag lever arm 56 and generally parallel to, and in the same direction as, the second airbag lever arm 55. Similarly, the second airbag lever arm 55 carries second airbag seat 55a at an end portion opposite the tubular axle body 35 that extends perpendicular to the second airbag lever arm 55 and generally parallel to, and in the same direction as, the first airbag lever arm 56.

A biasing spring lever arm 57 is structurally carried by the tubular axle body 35 between the first airbag lever arm 56 and the second airbag lever arm 55. The biasing spring lever arm 57 extends radially from the tubular axle body 35 generally perpendicular to the first airbag lever arm 56 and defines in an end portion opposite the axle body 35 a hole 59 carrying one end portion of a biasing spring 62. End portion of the biasing spring 62, opposite the lever arm 57 communicates with a spring bracket 26 that structurally depends from rearwardly extending extension arm 84 carried by sway bar 40. The biasing spring 62 draws outer end portion of the lever arm 57 toward the sway bar 40 biasing the tubular axle body 35 to rotate in a clockwise direction R when viewed as shown in FIG. 9.

The sway bar 40 is an elongate box beam extending between the two spaced apart sway bar brackets 58 and is structurally attached to one sway bar bracket 58 at each opposing end. The sway bar 40 structurally carries first airbag base 24 (FIGS. 8 and 9) spacedly adjacent the first airbag seat 56a, and structurally carries a second airbag base 25 (FIGS. 6 and 7) spacedly adjacent the second airbag seat 55a.

The first airbag 60 is positionally maintained between the first airbag seat 56a and the first air bag base 24 by known means (not shown). The second airbag 61 is positionally maintained between the second airbag seat 55a and the second air bag base 25 by known means (not shown).

The first airbag 60 expands in a generally vertical direction as it inflates responsive to receiving inflow of pressurized air from the pneumatic system 13. Expansion of the first airbag 60 forces the first airbag seat 56*a* away from the first airbag base 24 causing the tubular axle body 35 to rotate clockwise in a first direction R. (FIG. 9). Conversely, when the pneumatic system 13 directs pressurized air into the second airbag 61, the second airbag 61 expands in a generally horizontal direction which forces the second airbag seat 55*a* away from the second airbag base 25 causing the tubular axle body 35 to rotate counter-clockwise in a second direction R' and stretching the coil biasing spring 62. (FIG. 8). Only one airbag 60, 61 may receive inflow of pressurized air from the pneumatic system 13 at any one time and while one airbag 60, 61 is inflating the other airbag 60, 61 is deflating.

Figures 14, 15:
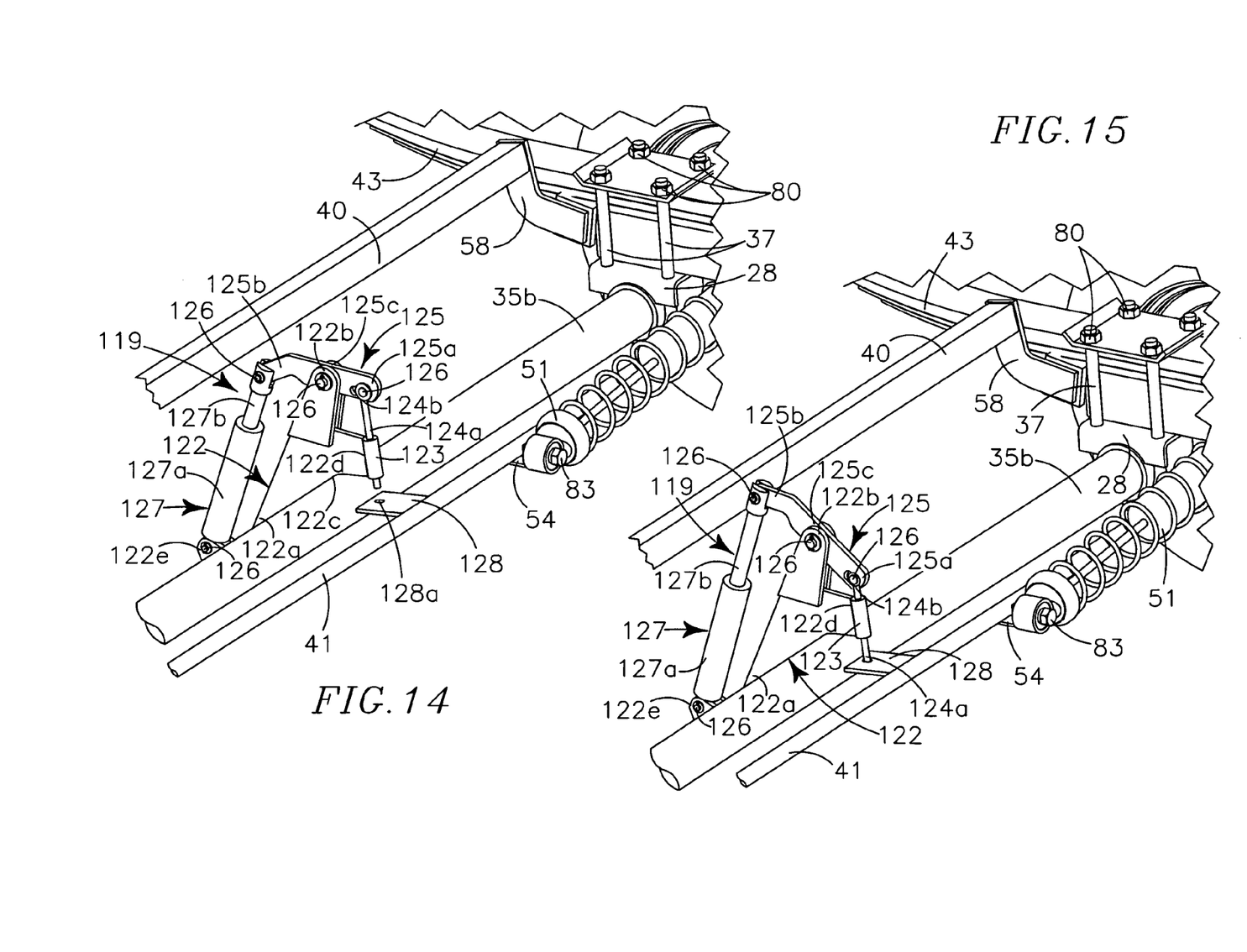
FIG. 14 is an enlarged partial isometric front and top view of the axle locking mechanism on the steering axle, less the airbag assemblies and less the biasing spring, showing the locking pin disengaged from the locking pin hole defined in the tie rod plate so that the steering axle may steer.
FIG. 15 is an enlarged partial isometric view similar to that of FIG. 14 showing the axle locking pin engaged in the locking pin hole defined in the tie rod plate.

As shown in FIGS. 14 and 15 the axle lock mechanism 119 has an air cylinder bracket 122 carrying a pivoting lever arm 125, an air cylinder 127, and a locking pin 124.

The air cylinder bracket 122 extends radially from the tubular axle body 35 and has a lower end portion 122*a*, an upper end portion 122*b*, a forward vertical edge 122*d* and defines a concave notch portion 122*c* between the forward edge portion 122*d* and the lower end portion 122*a*. The concave notch portion 122*c* communicates with and is structurally attached to the outer circumferential surface of the tubular axle body 35, such as by welding along the adjoining portions. The pivoting lever arm 125 has a locking pin end portion 125*a*, a piston end portion 125*b* and a medial portion 125*c*. The pivoting lever arm 125 is pivotally attached to the air cylinder bracket 122 with a bolt type axle 126 carried in aligned holes (not shown) defined in the upper end portion 122*b* of the air cylinder bracket 122 and the medial portion 125*c* of the lever arm 125.

Figure 12:
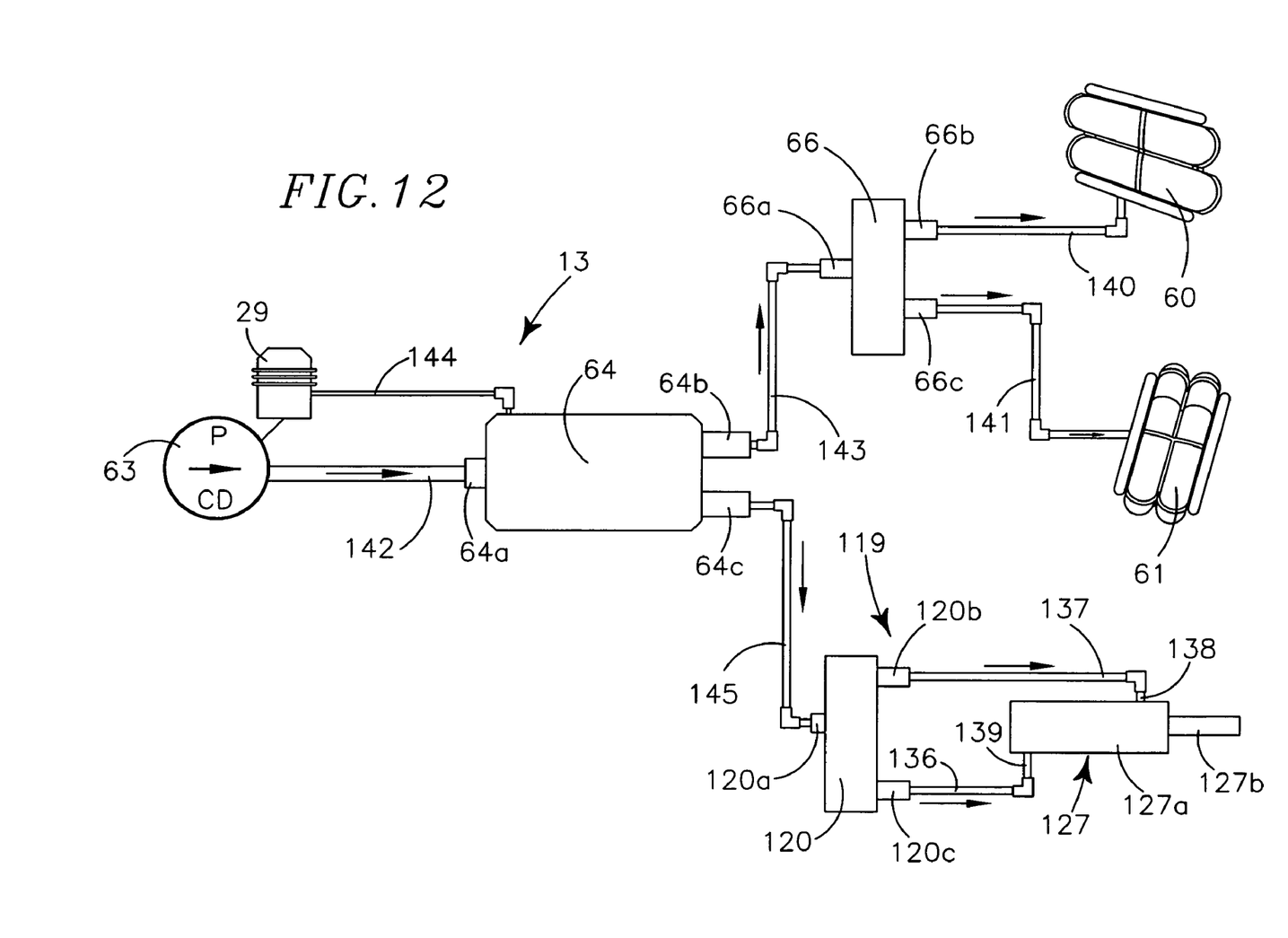
FIG. 12 is a pneumatic system diagram.

The air cylinder 127 is a double acting pneumatic cylinder having a piston housing 127*a* carrying a piston rod 127*b* that is movable axially relative to the piston housing 127*a* responsive to flow of pressurized air into the piston housing 127*a*. As shown in FIG. 12, inflow of pressurized air through input port 138 causes the piston rod 127*b* to move axially inwardly relative to the piston housing 127*a* while inflow of pressurized air through input port 139 causes the piston rod 127*b* to move axially outwardly relative to the piston housing 127*a*. End portion of the piston rod 127*b*, opposite the piston housing 127*a*, is connected to the piston end portion 125*b* of the pivoting lever arm 125 with a bolt type axle 126 carried in aligned holes (not shown) defined therein and therethrough. End portion of the piston housing 127*a*, opposite the piston rod 125*b*, is connected to flange 122*e* at the lower end portion 122*a* of the air cylinder bracket 122 with a bolt type axle 126 carried in aligned holes (not shown) defined therein and therethrough.

A tubular locking pin sleeve 123, defining a through channel (not shown), is structurally carried at the forward vertical edge 122*d* of the air cylinder bracket 122 and the locking pin 124 is movably carried therein. The locking pin 124 has a head portion 124*b* pivotally interconnected to the locking pin end portion of the lever arm 125 with a bolt type axle 126, and a shaft portion 124*a* that is movably carried in and extends through the channel defined by the locking pin sleeve 123. Axial movement of the piston rod 127*b*, relative to the piston housing 127*a*, pivots the lever arm 125 about the bolt type axle 126 at the medial portion 125*c* causing the pivotally attached locking pin 124 to move axially in the channel defined by the locking pin sleeve 123.

The tie rod plate 128 is carried by the tie rod 41 between the stabilizer shock mounting brackets 54 and extends rearwardly from the tie rod 41 toward the tubular axle body 35 so that it is below adjacent the locking pin sleeve 123 whereby lower end portion of the locking pin 124 extending downwardly through and outwardly of the locking pin sleeve 123 may engage with a locking pin hole 128*a* defined in the tie rod plate 128 when the axle locking mechanism 119 is activated.

The pneumatic system 13 is preferably carried in a protective compartment (not shown) on the towable wheeled vehicle 10. As shown in FIG. 12, the pneumatic system 13 has an electric air pump 63, a pressure switch 29, an air reservoir 64, an airbag pneumatic switch 66 in pneumatic communication with the first airbag 60 and the second airbag 61, and a locking mechanism pneumatic switch 120 in pneumatic communication with the air cylinder 127.

The electric air pump 63 is preferably a 2.57 cfm continuous delivery compressor manufactured by VI-AIR of Irvine Calif., such as a model 440-400C. The electric air pump 63 is in pneumatic communication with the air reservoir 64, which preferably has a 3 gallon capacity, through pneumatic line 142 that is interconnected with air reservoir input port 64*a*. The pressure switch 29, which is preferably a 20 amp 12 volt switch calibrated to "ninety PSI ON" and "one-hundred-twenty PSI OFF" electrically communicates with the electric air pump 63 and pneumatically communicates with the air reservoir 64 through pneumatic line 144. The pressure switch 29 monitors the air pressure inside the air reservoir 64 and automatically activates and deactivates the electric air pump 63 to maintain the air pressure inside the air reservoir 64 between ninety PSI and one-hundred-twenty PSI. The air reservoir 64 has one air input port 64*a*, a first air reservoir outlet port 64*b* and a second air reservoir outlet port 64*c*. The first air reservoir outlet port 64*b* pneumatically communicates with the airbag pneumatic switch 66 which is preferably a Sizto 4V 210-1/4G manufactured by the Sizto Technology Company. The airbag pneumatic switch 66 has a single air input port 66*a* in pneumatic communication with the air reservoir 64 through pneumatic line 143, a first air outlet port 66*b* in pneumatic communication with the first airbag 60 through pneumatic line 140, and a second air outlet port 66*c* in pneumatic communication with the second airbag 61 through pneumatic line 141. The first airbag 60 and the second airbag 61 are preferably four-inch Firestone airbags manufactured by the Bridgestone-Firestone Corporation of Tennessee.

The second air reservoir outlet port 64*c* pneumatically communicates with the locking mechanism pneumatic switch 120 which is preferably a Sizto 4V 210-1/4G manufactured by the Sizto Technology Company. The locking mechanism pneumatic switch 120 has a single air input port 120*a*, a first air outlet port 120*b* and a second air outlet port 120*c*.

Pressurized air from the air reservoir 64 flows from air reservoir outlet port 64*c* through pneumatic line 145 and enters the locking mechanism pneumatic switch 120 through input port 120*a*. Pressurized air exiting the locking mechanism pneumatic switch 120 through first air outlet port 120*b* passes through pneumatic line 137 and enters the air cylinder 127 through port 138 causing the piston rod 127*b* to move axially inwardly into the piston housing 127*a*. Axial inward movement of the piston rod 127*b* causes the pivoting lever arm 125 to draw the locking pin 124 vertically upwardly so that it is not engaged with the locking pin hole 128*a* defined in the tie rod plate 128 (FIG. 14), allowing the tie rod 41 to move back and forth as the wheel spindles 46, 47 turn on the kingpin axles 48.

Responsive to receipt of an electric signal, the locking mechanism pneumatic switch 120 re-directs the pressurized air entering through input port 120*a* outward through second outlet port 120*c* wherein the pressurized air passes through pneumatic line 136 and enters air cylinder 127 through port 139 causing the piston rod 127*b* to move axially outwardly from piston housing 127a. Axial outward movement of the piston rod 127b causes the pivoting lever arm 125 to move the locking pin 124 vertically downwardly causing the locking pin 124 to engage with the locking pin hole 128a defined in the tie rod plate 128 which positionally locks the tie rod 41 relative to the tubular axle body 35 stopping any lateral movement thereof and preventing steering of the steering axle 12.

Operation of the locking mechanism pneumatic switch 120 causing the pressurized air to flow outward through one selected outlet port 120b, 120c simultaneously releases air pressure in the non-selected outlet port 120b, 120c.

The electric air pump 63, the pressure switch 29 and air reservoir 64 operate in unison to provide continuous pressurized air flow to the airbag pneumatic switch 66. The airbag pneumatic switch 66 continuously directs the pressurized air to the first airbag 60 causing the first airbag 60 to expand as it inflates, axially rotating the tubular axle body 35 in the axle sleeves 36 in direction R for towing and forward movement. (FIG. 9). Only upon receipt of an electric signal will the airbag pneumatic switch 66 divert the pressurized airflow away from the first airbag 60 and direct the pressurized airflow to the second airbag 61 to reverse the wheel caster of the towable wheeled vehicle 10. The electric air pump 63, the pressure switch 29 and air reservoir 64 also provide continuous pressurized air to the locking mechanism pneumatic switch 120 which pneumatically communicates with the air cylinder 127 to optionally lock the steering axle 12 in a neutral position for towing and forward movement.

Figure 13:
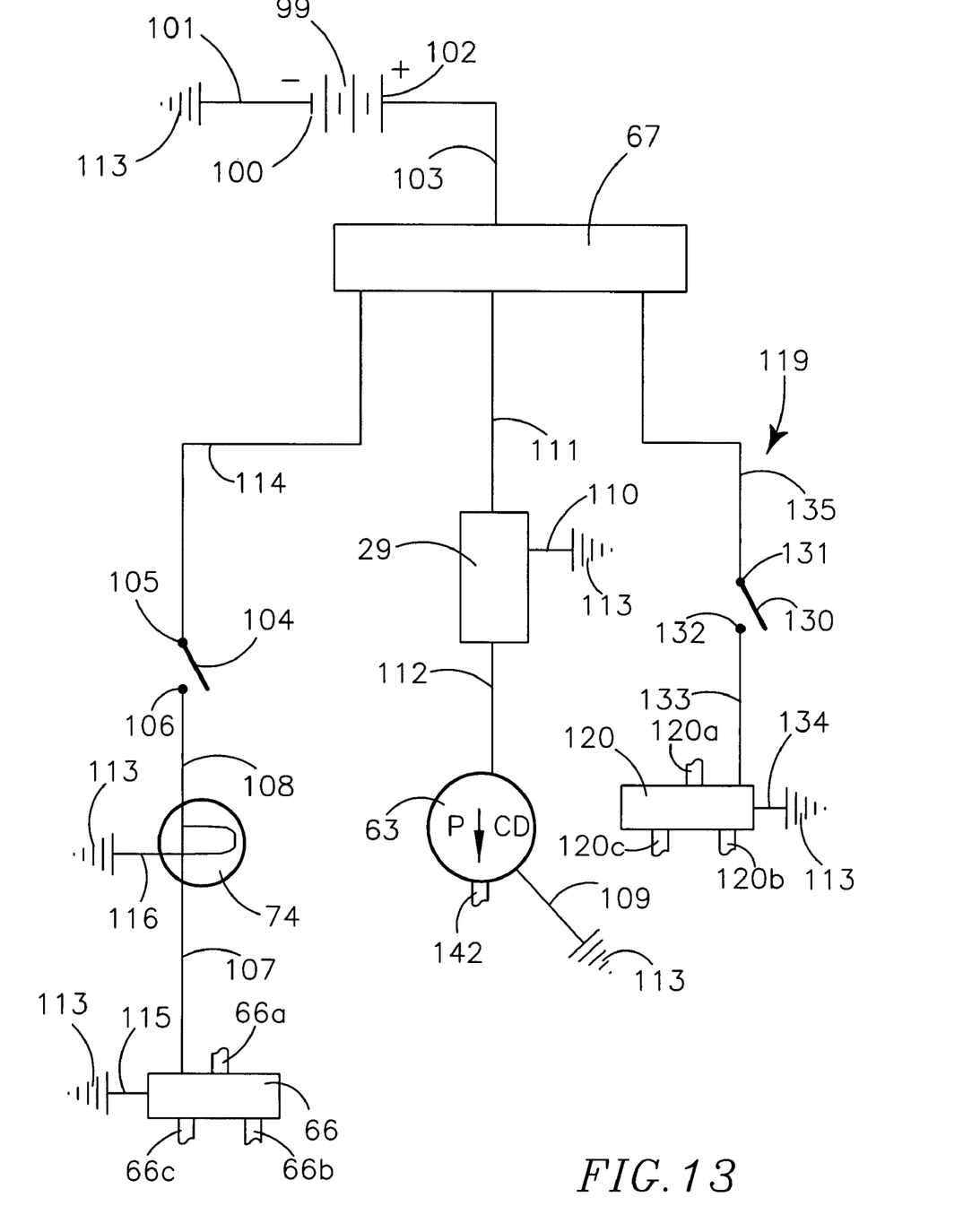
FIG. 13 is an electrical circuit diagram for powering the pneumatic system.

Referring to FIG. 13, the electrical circuit for powering the pneumatic system 13 has a battery 99 with a positive terminal 102 and a negative terminal 100. The battery 99 is preferably carried by the powered towing vehicle 68. The negative terminal 100 is connected to ground 113 by line 101. The positive terminal 102 is connected, by line 103, to fuse box 67 which carries a plurality of known fuses (not shown) that protect the various electrical components from electrical shorts and electrical surges and the like.

A known type of releasable trailer light plug connector (not shown), having two interconnecting portions is used to connect the electrical system of the towable wheeled vehicle 10 to the electrical system of the towing vehicle. Most commonly, the trailer light plug connector is proximate to the interconnection of the towing vehicle frame extensions 69 and the forward end portions 15a, 16a of the side beams 15, 16.

Voltage from the battery 99 through the fuse box 67 is continuously supplied to pressure switch 29 through line 111. Line 112 communicates between the pressure switch 29 and the electric air pump 63 providing voltage to the air pump 63 only when the pressure switch 29 detects, by means of pneumatic line 144, (FIG. 12) that the air pressure inside the air reservoir 64 has dropped below a predetermined level, preferably ninety PSI. The air pump 63 and pressure switch 29 each also communicate with ground 113 through line 109 and line 110 respectively.

Line 114 communicates between the fuse box 67 and a switch 104. The switch 104 varies between an open position, as shown in FIG. 13, when the towing vehicle is moving forwardly or is parked, and a closed position (not shown) when the towing vehicle is moving rearwardly wherein first terminal 105 is closed to contact second terminal 106. Switch 104 is preferably carried on the powered towing vehicle transmission (not shown) but may also be carried on the powered towing vehicle shifter mechanism (not shown) and may also be a manual switch (not shown). The second terminal 106 is connected by line 108 to powered vehicle backup lights 74 which are energized only when the powered towing vehicle moves rearwardly. Line 107 interconnects the backup lights 74 to the airbag pneumatic switch 66 which controls flow of pressurized air to the first airbag 60 and to the second airbag 61 through pneumatic lines 140 and 141 respectively. (FIG. 12). Line 116 provides a ground 113 for the backup lights 74 while line 115 provides a ground 113 to the airbag pneumatic switch 66.

When switch 104 is open the backup lights 74 are not energized and the airbag pneumatic switch 66 directs the pressurized air flow through outlet port 66b and pneumatic line 140 to the first airbag 60 causing inflation thereof and axial rotation of the axle body 35 in direction R generating positive caster for forward movement of the towable wheeled vehicle 10. When the powered towing vehicle moves rearwardly switch 104 is closed. Closing switch 104 causes voltage from the battery 99 through the fuse box 67 to pass to the backup lights 74, through line 108, causing energizing thereof, and to the airbag pneumatic switch 66 through line 107. Voltage to the backup lights 74 and the airbag pneumatic switch 66 causes the airbag pneumatic switch 66 to interrupt the flow of pressurized air through the first outlet port 66b to the first airbag 60, and redirect the pressurized airflow through second outlet port 66c to the second airbag 61 through pneumatic line 141. Pressurized airflow into the second airbag 61 causes expansion thereof forcing the second airbag seat 55a away from the second airbag base 25 responsively rotating the axle body 35 in the axle sleeves 36 in direction R' which reverses the caster of the wheels 49 and tires 82 for backing up. Re-direction of the pressurized airflow into the second airbag 61 simultaneously releases the air pressure in the first airbag 60.

FIG. 13 also shows the electrical circuit for the axle locking mechanism 119. Line 135 communicates between the fuse box 67 and first terminal 131 of an axle lock switch 130 which is preferably a double pole single throw switch carried in the operator cab (not shown) of the powered towing vehicle. Second terminal 132 of the axle lock switch 130 electrically communicates with locking mechanism pneumatic switch 120 through line 133. Line 134 communicates between the locking mechanism pneumatic switch 120 and the ground 113. The axle lock switch 130 is normally in an open position (FIG. 13). When the axle lock switch 130 is open, pressurized air flow through the first outlet port 120b (FIG. 12) causes the piston rod 127b to move axially inwardly retracting into the piston housing 127a causing the locking pin 124 to disengage from the locking pin hole 128a defined in the tie rod plate 128 allowing the tie rod 41 to freely move back and forth so that the wheels 82 on the steering axle 12 may steer.

Conversely, when axle lock switch 130 is in a closed position, (not shown) first terminal 131 electrically communicates with second terminal 132 passing voltage from the battery 99 through the fuse box 67 to the locking mechanism pneumatic switch 120. When locking mechanism pneumatic switch 120 receives voltage, pressurized airflow through the first outlet port 120b is interrupted and is re-directed through the second outlet port 120c causing the piston rod 127b to move axially outwardly from the piston housing 127a causing the locking pin 124 to engage with the locking pin hole 128a defined in the tie rod plate 128 effectively locking the tie rod 41 and preventing the steering axle 12 from steering.

Having described the structure of my towable wheeled vehicle having a steering axle, its operation may be understood.

The towing vehicle, which may itself be a towed vehicle such as a trailer, is provided with towing vehicle frame extensions 69 that extend rearwardly from the towing vehicle frame in spaced apart adjacency. The towable wheeled vehicle 10 is positioned behind the towing vehicle such that the forward end portion 15a of the driver side beam 15 is adjacent rearward the frame extension 69 on the driver side of the towing vehicle, and the forward end portion 16a of the passenger side beam 16 is adjacent rearward the frame extension 69 on the passenger side of the towing vehicle. The forward end portions 15a, 16a of the side beams 15, 16 are aligned with the frame extensions 69 and the releasable tow bar fasteners 21 are inserted through the aligned holes (not shown) defined therein and therethrough.

The portion of the trailer light plug connector (not shown) carried by the towable wheeled vehicle 10 is interconnected with the portion of the trailer light plug connector carried by the towing vehicle. The operator should activate the towable wheeled vehicle lights (not shown) such as the blinkers and brake lights and verify that the lights function appropriately.

If a cargo (not shown) is to be carried on the deck 27, it is loaded and secured as necessary.

While driving the powered towing vehicle at relatively slow speeds, such as on city and residential streets the locking mechanism switch 130 should be in an open position so that the steering axle 12 is unlocked and the wheel spindles 45, 46 move freely steering the towable wheeled vehicle 10 behind the towing vehicle without skidding the tires 82 around corners.

While driving the powered towing vehicle at higher speeds, such as on a highway, the locking mechanism switch 130 in the operator cab should be in the closed position which causes the air cylinder 127 to move the locking pin 124 to engage with the locking pin hole 128a defined in the tie rod plate 128. Locking the steering axle 12, while traveling at higher rates of speed, provides additional stability for the towable wheeled vehicle 10 and any other towed vehicles behind the powered towing vehicle.

When the powered towing vehicle, the towed behind towable wheeled vehicle 10 and any other medially interconnected vehicles are to be backed up, the axle lock switch 130 in the operator cab (not shown) is placed in an open position so that the steering axle 12 may steer. The powered towing vehicle is shifted into reverse gear which energizes the backup lights 74 and causes the pressurized air flowing through the airbag pneumatic switch 66 to be directed to the second airbag 61. Inflation and resulting expansion of the second airbag 61 causes the first airbag 60 to contract and causes the tubular axle body 35 to rotate axially within the axle sleeves 36. As the tubular axle body 35 rotates, the positive caster φ (line 77 on FIG. 10) is changed to negative caster Ø (line 78 on FIG. 10). Reversing the caster to negative 78 causes the wheel spindles 46, 47 and wheel tire combinations 82 carried thereon, to turn in the opposite direction of the powered towing vehicle's steering wheels as the powered towing vehicle is backed up preventing jack-knifing.

Having thusly described my invention, what I desire to protect by Letters Patent, and

What I claim is:

1. A towable wheeled vehicle having a frame with two spaced apart parallel side beams and a steering axle, said towable wheeled vehicle releasably attachable to a towing vehicle having a power source operatively communicating with back up lights energized when the towing vehicle moves rearwardly, the towable wheeled vehicle comprising in combination:
    a first airbag lever arm and a second airbag lever arm structurally attached to the steering axle extending radially therefrom and angularly to each another;
    a first airbag communicating between the first airbag lever arm and the frame, and a second airbag communicating between the second airbag lever arm and the frame;
    an air pump electrically communicating with the power source;
    a pneumatic switch communicating with the air pump, with the first airbag and with the second airbag;
    an electric circuit operatively communicating with the back up lights and with the pneumatic switch, wherein the pneumatic switch directs pressurized air to the first airbag when the back up lights are not energized, and wherein the pneumatic switch directs pressurized air to the second airbag when the back up lights are energized wherein inflation of the first airbag rotates the steering axle axially in axle sleeves providing positive caster and inflation of the second airbag rotates the steering axle axially in the axle sleeves providing negative caster; and
    two spaced apart frame extensions carried by the towing vehicle and extending rearwardly therefrom, each towing vehicle frame extension having a rearward end portion defining a hole for a towbar fastener pivotally connecting each towing vehicle frame extension to a forward end portion of one spaced apart parallel side beam of the towable wheeled vehicle frame.

2. The towable wheeled vehicle of claim 1 further comprising:
    a first leaf spring depending from a first frame side beam and a second leaf spring depending from a second frame side beam;
    wherein the axle sleeves comprise a first axle sleeve carried on the steering axle and affixed to the first leaf spring, and a spaced apart second axle sleeve carried on the steering axle and affixed to the second leaf spring;
    a spindle yoke structurally carried at each opposing end of the steering axle, each spindle yoke angled relative to the steering axle to provide camber to an attached rotatable wheel;
    an axle spindle journaled by each spindle yoke, each axle spindle having a king pin sleeve defining a channel for a kingpin axle, a stub axle perpendicular to the kingpin sleeve carrying the rotatable wheel, and a tie rod arm perpendicular to the kingpin sleeve and perpendicular to the stub axle; and
    an elongate tie rod communicating with the tie rod arm of each axle spindle and extending therebetween.

3. The towable wheeled vehicle of claim 1 further comprising:
    an axle locking mechanism having,
        an air cylinder bracket with an upper end portion carrying a pivoting lever arm, a forward edge portion carrying a locking pin sleeve defining a channel therethrough, and a bottom end portion, said air cylinder bracket structurally attached to the steering axle;
        an air cylinder having an air cylinder housing and a piston rod axially movable relative to the air cylinder housing, the air cylinder communicating between the bottom end portion of the air cylinder bracket and an end portion of the lever arm opposite the locking pin sleeve;
        a locking pin axially movable in the channel defined by locking pin sleeve and pivotally interconnected to end portion of the pivoting lever arm opposite the piston rod;
        a locking mechanism pneumatic switch pneumatically communicating with the air pump and with the air cylinder;
        an axle lock switch electrically communicating with the power source and having a first open position and a second closed position;

an electric circuit operatively communicating with the axle lock switch and with the locking mechanism pneumatic switch, wherein the locking mechanism pneumatic switch directs pressurized air to the air cylinder causing the piston rod to move in a first direction when the axle lock switch is in the open first position, and wherein the locking mechanism pneumatic switch directs pressurized air to the air cylinder causing the piston rod to move in a second direction when the axle lock switch is in the second closed position;

a tie rod parallel to and spacedly forwardly adjacent the steering axle; and a tie rod plate carried by the tie rod below adjacent the locking pin sleeve, the tie rod plate defining a hole for engagement with a portion of the locking pin extending through the locking pin sleeve.

4. The towable wheeled vehicle of claim 1 further comprising:

a biasing spring having, a lever arm structurally attached to the steering axle and extending radially therefrom; and a spring having a first end portion communicating with the lever arm and a second end portion communicating with the frame wherein the spring biases the lever arm toward the second end portion of the spring.

5. A towable wheeled vehicle releasably attachable to a towing vehicle having a power source operatively communicating with back up lights energized when the towing vehicle moves rearwardly, the towable wheeled vehicle comprising in combination:

a frame supporting a deck, said frame having, a first side beam and a parallel spaced apart second side beam, each side beam having a forward end portion defining a hole for a releasable tow bar connector, and a rearward end portion, a first leaf spring depending from the first side beam and a second leaf spring depending from the second side beam, a first axle sleeve defining a channel therethrough affixed to the first leaf spring with plural U-bolts, and a second axle sleeve defining a channel therethrough affixed to the second leaf spring with plural U-bolts;

a tubular steering axle carried by, and axially rotatable within, the channels defined by the axle sleeves, the tubular steering axle having, a spindle yoke structurally carried at each opposing end, each spindle yoke angulated relative to the steering axle to provide positive camber to an attached rotatable wheel, an axle spindle having a king pin sleeve defining a channel therethrough for carriage of a kingpin axle, a stub axle perpendicular to the kingpin sleeve carrying a rotatable wheel and a tie rod arm perpendicular to the kingpin sleeve and perpendicular to the stub axle, one axle spindle journaled by each spindle yoke on the kingpin axle extending through the kingpin sleeve, an elongate tie rod communicating with the tie rod arm of each axle spindle, the tie rod parallel to and spacedly forwardly adjacent the steering axle, a first airbag lever arm and a second airbag lever arm structurally attached to the tubular steering axle extending radially therefrom and angularly to one another, each airbag lever arm carrying an airbag seat at an end portion opposite the steering axle, an elongate sway bar parallel to and spacedly rearwardly adjacent the steering axle, the sway bar carrying a first airbag base spacedly adjacent the first airbag seat and a second airbag base spacedly adjacent the second airbag seat, a first airbag communicating between the first airbag seat and the first airbag base, and a second airbag communicating between the second airbag seat and the second airbag base, a biasing spring lever arm structurally attached to the steering axle and extending radially therefrom, a spring communicating between the biasing spring lever arm and the sway bar to bias the lever arm toward the sway bar, and a self centering stabilizer shock having an inner end portion communicating with the tie rod and an outer end portion communicating with the frame;

a pneumatic system having, an air pump pneumatically communicating with an air reservoir and electrically communicating with the power source, an airbag pneumatic switch pneumatically communicating with the air reservoir, with the first airbag and with the second airbag, an electric circuit operatively communicating with the towing vehicle back up lights and with the airbag pneumatic switch, wherein the airbag pneumatic switch directs pressurized air from the air reservoir to the first airbag when the back up lights are not energized, and wherein the airbag pneumatic switch directs pressurized air from the air reservoir to the second airbag when the back up lights are energized wherein inflation of the first airbag moves the first airbag seat away from the first airbag base rotating the steering axle axially in the axle sleeves providing positive caster, and inflation of the second airbag moves the second airbag seat away from the second airbag base rotating the steering axle axially in the axle sleeves providing negative caster;

an axle locking mechanism, said axle locking mechanism having, an air cylinder bracket with an upper end portion carrying a pivoting lever arm, a forward edge portion carrying a locking pin sleeve defining a through channel, and a bottom end portion having a flange, the air cylinder bracket structurally attached to the tubular steering axle and extending radially therefrom, a double acting air cylinder having a cylinder housing and a piston rod movable axially into and out of the cylinder housing, the air cylinder communicating between the air cylinder bracket flange and end portion of the pivoting lever arm opposite the locking pin sleeve, a locking pin pivotally interconnected to end portion of the pivoting lever arm proximate to the locking pin sleeve and axially movable in the channel defined by locking pin sleeve, a locking mechanism pneumatic switch pneumatically communicating with the air reservoir and with the locking mechanism air cylinder, an axle lock switch having a first open position and a second closed position in electrical communication with the power source, an electric circuit operatively communicating with the axle lock switch and with the locking mechanism pneumatic switch, wherein the locking mechanism pneumatic switch directs pressurized air from the air reservoir to the air cylinder causing the piston rod to move in a first direction when the axle lock switch is in the first open position, and wherein the locking mechanism pneumatic switch directs pressurized air from the air reservoir to the air cylinder causing the piston rod to move in a second direction when the axle lock switch is in the second closed position, and a tie rod plate carried by the tie rod below adjacent the locking pin sleeve the tie rod plate defining a locking pin hole for engagement with an end portion of the locking pin; and two spaced apart rearwardly extending frame extensions carried by the towing vehicle, each frame extension having a rearward end portion configured for releasable engagement with the forward end portions of the towable wheeled vehicle frame side beams, each rearwardly extending frame extension defining a hole to carry a releasable towbar fastener extending therethrough.

* * * * *